United States Patent [19]

Bishov

[11] 4,110,483
[45] Aug. 29, 1978

[54] METHOD OF STABILIZING FOODS WITH AN ANTIOXIDANT

[75] Inventor: Solomon J. Bishov, Framingham, Mass.

[73] Assignee: The United States of America as represented by the Secretary of the Army, Washington, D.C.

[21] Appl. No.: 820,473

[22] Filed: Aug. 1, 1977

[51] Int. Cl.² ............................................... A23L 3/34
[52] U.S. Cl. ................................... 426/542; 426/546; 426/655
[58] Field of Search ............... 426/542, 544, 602, 604, 426/546, 655

[56] References Cited

PUBLICATIONS

Braverman, J. B. S. "Introduction to the Biochemistry of Foods," Elsevier Publ. Co., N. Y., 1963, pp. 246–247.
Furia, T. E. "Handbook of Food Additives," The Chemical Rubber Co., Cleveland, Ohio, pp. 220–221 and pp. 229–231.

Primary Examiner—Robert A. Yoncoskie
Attorney, Agent, or Firm—Nathan Edelberg; Robert P. Gibson; Charles C. Rainey

[57] ABSTRACT

A method of stabilizing oxidation susceptible food against oxidation comprising adding to the food a synergistic antioxidant composition comprising a synthetic phenolic-type antioxidant, butylated hydroxyanisole (BHA), and the solids (or solids and liquids) from certain naturally occurring spices or herbs.

4 Claims, No Drawings

METHOD OF STABILIZING FOODS WITH AN ANTIOXIDANT

The invention described herein may be manufactured, used, and licensed by or for the Government for governmental purposes without the payment to us of any royalty thereon.

BACKGROUND OF THE INVENTION

This invention relates to synergistic antioxidant compositions and to a method of stabilizing food materials therewith. More particularly, the invention relates to reducing the concentration of a well-known and widely used synthetic antioxidant by the employment in combination therewith of a synergistic antioxidant material derived from naturally occurring spices or herbs.

It has been customary in the processing of a great many foods, which are to be stored for long periods of time between their manufacture and their ultimate consumption, to add small quantities of antioxidants to the foods during their manufacture. Among the more frequently employed antioxidants for this purpose is butylated hydroxyanisole (frequently referred to as BHA), which is a synthetic phenolic-type antioxidant. This antioxidant is often used in foods provided its concentration therein does not exceed a certain value permitted by the Food and Drug Administration.

In recent years, much concern has developed with regard to the addition of synthetic materials to foods, perhaps more from the standpoint of the possibility that synthetic materials in contrast to naturally occurring materials may be more conducive to abnormalities in the growth and development of human beings, or of animals which are used as sources of food products. Whatever the reason for the concern, it appears desirable to reduce the concentrations of synthetic antioxidants as much as possible while still adequately protecting food products against oxidation since the latter type of reaction develops off-flavors and off-odors and may, in certain cases, result in the formation of products in foods which may produce toxic or allergic or other undesirable results. In any event, such oxidation products frequently make foods less acceptable as their concentrations increase.

It is, therefore, an object of the invention to provide an antioxidant composition comprising a synthetic phenolic-type antioxidant, the antioxidant action of which is synergized by means of a composition derived from naturally occurring plant materials so that the concentration of the synthetic phenolic-type antioxidant may be reduced below that which is normally required for good antioxidant effect and stabilization of a food product in the absence of such a synergistic material.

A further object of the invention is to provide a method of stabilizing a food product intended for human or animal consumption against oxidation thereof involving the use with the food material of an antioxidant composition comprising a synergistic mixture phenolic-type antioxidant with a synergist derived from a naturally occurring plant material.

Other objects and advantages will become apparent from the following description of the invention, and the novel features will be particularly pointed out hereinafter in connection with the appended claims.

SUMMARY OF THE INVENTION

The objects of the invention are accomplished by combining a whole spice or herb or an extract prepared from one or a plurality of the members of a select group of naturally occurring spices or herbs, or the solids (or solids and liquids) recovered from such an extract, with a synthetic phenolic-type antioxidant and incorporating such a combination in a food product which, in the absence of the antioxidant composition, would be subject to rapid oxidation in the presence of air. In general, because of the unexpected synergistic action of the spices or herbs, it is not necessary to employ nearly so high a concentration of the synthetic phenolic-type antioxidant in the food product as when there is substantially no added spice or herb material present in the food.

Since spices and certain herbs are naturally occurring materials which are edible, there appears to be no reason why such edible spices or herbs would not be permissible in food products along with small concentrations of synthetic phenolic-type antioxidants which have been proven to be effective and which are permitted to be added to foods in concentrations up to certain legally acceptable concentrations, especially when their presence along with the synthetic phenolic-type antioxidant makes possible an appreciable reduction in the concentration of the synthetic phenolic-type antioxidant due to the synergistic action of the spice or herb material, without excessive loss of stabilizing effect on the food involved.

The synthetic phenolic-type antioxidant which has become probably the most widely used synthetic antioxidant in food products is butylated hydroxyanisole, which is abbreviated herein and is generally designated as BHA. This combination of a synthetic phenolic-type antioxidant with various synergists derived from natural sources, the effectiveness of which I have discovered, particularly for use in foods, is the subject of the invention.

Butylated hydroxyanisole (BHA) is a mixture of isomers of 4-hydroxyanisole having a tertiary butyl group substituted in the benzene ring at the 2- or 3- position. BHA in an amount up to 0.02 percent by weight of the oil or fat present is permitted in food products by the Food and Drug Administration. The antioxidant effect of BHA increases as the concentration thereof increases up to 0.02 percent, then levels off as its concentration is increased. It is known to be possible to obtain about the same degree of protection of oxidation susceptible foods by incorporating various amounts of other antioxidants in such foods, such as amino-acids, hydrolyzed vegetable proteins, or autolyzed yeast protein. However, such materials are generally employed in comparatively large amounts, e.g. 10 percent or more, in order to be very effective. Such materials are also known to synergize the antioxidant action of BHA and thus to make a reduction in the amount of BHA used to protect oxidation susceptible foods against oxidation. However, rather large concentrations of such synergists are required along with a reduced concentration of BHA in order to obtain adequate protection of such foods against oxidation.

I have found that certain whole spices and herbs, or extracts from such spices and herbs, particularly alcohol extracts thereof, and the solids (or solids and liquids) recovered from such extracts, when used in combination with BHA, the latter being used at less than the 0.02 percent maximum permitted by the Food and Drug Administration, exhibit a marked synergistic effect on the BHA, even when such spices and herbs or extracts obtained therefrom or the solids (or solids and liquids) recovered therefrom, are used in appreciably lower amounts than those required for amino-acids, hydrolyzed vegetable proteins, or autolyzed yeast protein when the latter types of antioxidants are used in combination with BHA. I have found that I can decrease the level of BHA to about 0.005 percent by incorporating in the oxidation susceptible food this amount of BHA along with about 1 to about 5 percent of one of the group or spices or herbs of the present invention. Similarly, I have found that alcoholic extracts containing approximately 15 to 40 percent of the whole spice or herb may be employed as synergists for BHA used as an antioxidant in foods to obtain adequate protection of the oxidation susceptible food. Such a combination does not impart an objectionable odor or taste of the spice or herb components to the food. This compares quite favorably with other known synergists for BHA or other synthetic phenolic-type antioxidants and makes possible reduction of the concentration of BHA in oxidation susceptible foods to or even below about one-fourth the concentration permitted by the Food and Drug Administration and the concentration usually employed by processors of oxidation susceptible foods.

Furthermore, by taking advantage of the synergistic activity of the whole spices and herbs, or of the spice or herb extracts, or of the extracted materials recovered therefrom, in many cases foods which are not so oxidation susceptible as others can be adequately protected by even lower concentrations of BHA than 0.005 percent, e.g. as low as 0.0005 percent, in combination with one of the spices or herbs, or extracted materials therefrom, and particularly so if yet higher concentrations of the spice or herb materials than those described above are desirable or can be tolerated in the food from the standpoint of flavor or odor or other characteristics of such spices and herbs in foods. Thus, excellent protection against oxidation is now readily available for oxidation susceptible foods, such as oil- or fat-containing foods, without the use of more than a very small amount of a synthetic antioxidant such as BHA.

In general, the invention is applicable to any concentration of BHA in a food product which is susceptible to oxidation from about 0.0001 percent up to about 0.02 percent. Of course, concentrations of BHA above that approved by the U.S. Food and Drug Administration for use in foods for human beings will not be used even though they will work.

In general, from about 1.0 percent to about 10.0 percent by weight of the spice or herb (or about 0.2 percent to about 2.0 percent of the solids or solids and liquids from the spice or herb recovered from an extract prepared therefrom) is preferably used in combination with BHA to synergize the antioxidant effect of the BHA, although other concentrations of from about 0.1 percent to about 25.0 percent of the spice or herb by weight (or about 0.02 percent to about 5.0 percent of the solids or solids and liquids from the spice or herb recovered from an extract prepared therefrom) may be used, if found desirable, in order to decrease the concentration of the BHA used to accomplish protection of food products against oxidation.

Throughout the specification and claims the percentages of the antioxidant materials used in foods are based on the weight of oxidation susceptible oil or fat used and, therefore, needing protection against oxidation.

For the purposes of the specification and claims, the term "oxidation susceptible oil or fat" is intended to mean any oil or fat which is susceptible or subject to oxidation by the oxygen in the ambient atmosphere to which the oil or fat is exposed. Such oxidation susceptibility increases with increasing temperatures, but may occur at temperatures appreciably below room temperature.

A food in which there is a significant inhibition of oxidation by a combination of the antioxidant BHA and a synergist in accordance with the invention is to be understood as a food comprising such a combination of antioxidant components which exhibits a stability factor of at least 2 and a percent synergism of at least 25 with respect to the oxidation susceptible oils or fats in the food.

DESCRIPTION OF THE PREFERRED EMBODIMENT

The invention may be better understood by reference to the following examples, which are for illustrative purposes, and are not intended to limit the scope of the invention.

EXAMPLE 1

Butylated hydroxyanisole (BHA), manufactured by Distillation Products Industries Division, Eastman Chemical Products, Inc. in an emulsion with tocopheral-free corn oil, manufactured by Distillation Products Division, Eastman Chemical Products, Inc., carboxymethyl cellulose, manufactured by Hercules, Inc. and one of six different spices or herbs prepared as described hereinafter were combined and shell frozen and thereafter freeze dehydrated prior to oxidation studies on the freeze-dried mixture to determine the induction period at 65° C. for the combination. The carboxymethyl cellulose (CMC) serves as an inert matrix for the antioxidant and oil mixture. Individual samples were prepared by adding (in succession) to a blender cup 50 ml water, the antioxidant material (BHA) as required, the synergistic antioxidant material (spice or herb) as required, 1 g CMC, and dropwise with intermittent mixing in a blender 1 g of tocopherol-free corn oil. The final mixture was blended for 2 minutes, transferred to a 250 ml round bottom flask, shell frozen, and freeze dehydrated. The oxidation of each sample was carried out in the 250 ml round bottom flask under an atmosphere of air at 65° C. The flasks were closed with rubber serum stoppers. Oxygen in the headspace was determined periodically by gas chromatography according to the method described in the Journal of the American Oil Chemists Society, Vol. 43, page 477. The induction period (I.P.) is defined as the time (in hours) at which 50 percent of the original oxygen in the headspace has been consumed. Since the induction period for the control sample may vary somewhat from one set of samples to another, the various samples are compared on the basis of stability factor (S.F.), which is defined as the ratio of the induction period of a given sample to the induction period of the control. Thus the stability factor of the control is always 1.0 and the stability factors of the samples containing various antioxidants or combinations thereof will be greater than 1.0.

The percent synergism (Syn. %) for a given combination of BHA antioxidant and spice or herb antioxidant is calculated from the equation:

$$\text{Syn. \%} = 100\,[(M-C)-(P-C)-(S-C)]\,/\,(M-C)$$

in which
- M = the S.F. of the combination or mixture of antioxidants
- P = the S.F. of the phenolic (BHA) antioxidant
- S = the S.F. of the spice or herb
- C = the S.F. of the control (no antioxidant)

Each S.F. value represents the average of duplicate determinations. The mean Syn. % value is the average value for all of the Syn. % values for a given combination of BHA with any one spice or herb.

Table 1 summarizes the results of various combinations of BHA with the whole, ground, dry spice or herb, as the case may be. In every case the percentage of antioxidant or of spice or herb is based on the weight of the oil, which starts out substantially free of antioxidant before the addition thereto of BHA and/or spice or herb material in whatever form it takes.

Table 1

| % SPICE OR HERB SOLIDS | % BHA 0 S.F. | 0.005 S.F. | Syn. % | 0.01 S.F. | Syn. % |
|---|---|---|---|---|---|
| SAGE (Salvia officinalis L.) | | | | | |
| 0.0 | 1.0 | 1.9 | — | 3.0 | — |
| 2.5 | 5.2 | 13.5 | 59 | 13.0 | 32 |
| 5.0 | 8.9 | 13.2 | 33 | — | — |
| MACE (Myristica fragrans Houtt) | | | | | |
| 0.0 | 1.0 | 1.9 | — | 3.0 | — |
| 2.5 | 4.8 | 7.3 | 48 | 7.5 | 14 |
| 5.0 | 6.0 | 8.0 | 39 | — | — |
| ROSEMARY (Rosmarinus officinalis L.) | | | | | |
| 0.0 | 1.0 | 1.9 | — | 3.0 | — |
| 2.5 | 3.5 | 7.6 | 50 | 7.0 | 25 |
| 5.0 | 4.8 | 7.3 | 48 | — | — |
| GREEK SAGE (Salvia triloba L.) | | | | | |
| 0.0 | 1.0 | 1.9 | — | 3.5 | — |
| 2.5 | 4.7 | 9.9 | 48 | 8.6 | 44 |
| 5.0 | 6.0 | 10.4 | 37 | 9.5 | 30 |
| SWEET FERN (Comptonia peregrina) | | | | | |
| 0.0 | 1.0 | 1.9 | — | 2.7 | — |
| 2.5 | 4.3 | 9.9 | 45 | 8.4 | 57 |
| 5.0 | 6.3 | 11.7 | 42 | 10.9 | 53 |
| Tilia hrezentia | | | | | |
| 0.0 | 1.0 | 1.9 | — | 2.8 | — |
| 2.5 | 4.6 | 9.3 | 46 | 8.0 | 23 |
| 5.0 | 7.1 | 12.7 | 40 | — | — |

It is apparent that each of the spices and herbs listed in Table 1 exhibits an appreciable synergism with respect to BHA, particularly when the BHA is present at the low concentration of 0.005 percent based on the oxidation susceptible oil, a concentration of BHA which is one-fourth the concentration permitted by the Food and Drug Administration as an additive in foods.

EXAMPLE 2

In this example, samples of Comptonia peregrina were prepared for oxidation to determine stability factors in the same manner as in Example 1, with the exception that instead of the whole, ground, dry herb material (as in Example 1) the solids and liquids obtained by the evaporation of the ethanol from an extract of the whole, ground, dry herb material, representing about 18% of the whole herb which was soluble in 95% ethanol, were employed in preparing the various samples for the determination of stability factors at various concentrations. Table 2 gives the results obtained with these samples of BHA in combination with various concentrations of alcohol extract solids from the Comptonia peregrina herb.

Table 2

| % Alcohol Extract Solids and Liquids | % BHA 0 S.F. | 0.005 S.F. | Syn. % |
|---|---|---|---|
| 0.00 | 1.0 | 2.0 | — |
| 0.18 | 1.33 | 4.17 | 58 |
| 0.45 | 2.87 | 4.93 | 27 |
| 0.90 | 3.27 | 6.33 | 39 |
| 1.80 | 5.53 | 9.67 | 36 |

Mean Syn.% = 40

It is apparent that the alcohol extracts, when evaporated, provide mixtures of solids and liquids derived from the ground, whole, dried herb which are very active as synergists for BHA. In fact, the lowest concentration of the alcohol extract solids and liquids obtained showed the highest percent synergism with BHA used in combination therewith at the low concentration of 0.005 percent of BHA. Of course, still higher concentrations of the alcohol extract solids and liquids produce higher stability factors, but it is apparent that by using alcohol extracts rather than the ground, whole, dried herb the more active antioxidant and synergistic components of the herb may be employed in appreciably lower concentrations with a low concentration of BHA than the concentrations of the whole, dried herb shown to be effective with BHA in Example 1. Hence, there may be a greater likelihood of approval for the use of the alcohol extracts or the mixture of solids and liquids recovered therefrom than of the whole herb in the case of an herb which has good antioxidant and synergistic characteristics, particularly when used in combination with BHA.

Although the invention has been described in terms of use of whole, ground, dried spices and herbs of the types enumerated above and of the solids and liquids extracted from such spices and herbs by means of alcohol and recovered from such alcohol extracts, it is to be understood that the alcohol extracts per se may be employed in foods containing oxidation susceptible oils or fats to synergize the antioxidant action of BHA when added to such foods in permissible concentrations.

The concentration of BHA needed for protecting food containing oxidation susceptible oils and/or fats is already at a low level. However, the present invention makes possible still further reduction in the concentration of BHA needed to obtain a highly protective effect on such foods because of the synergistic antioxidative effects of the spices and herbs and of solids and liquids derived therefrom by extraction with alcohol. Other spices and herbs may be found to exercise similar effects on BHA and perhaps other phenolic-type antioxidants. However, the six spices and herbs described herein are highly effective as synergists for the antioxidant action of BHA in food products which are susceptible to oxidative degradation in the absence of an antioxidant, and are the most effective such synergists for BHA, particularly in terms of the magnitude of the concentration of the synergist required to reduce the concentration of BHA needed to at least as low as 0.005 percent based on the oxidation susceptible oil or fat present in the food products. Thus, the probabilities of harmful effects of such chemical additives as BHA on the health and well-being of consumers are markedly reduced as a result of the present invention. The potential savings in terms of health protection and food preservation and, therefore, economic savings, as a result of the invention are quite large.

I wish it to be understood that I do not desire to be limited to the exact details described, for obvious modifications will occur to a person skilled in the art.

I claim:

1. A process for the stabilization against oxidation of an oxidation susceptible oil or fat containing food, which comprises adding to said food an antioxidative amount of an antioxidant composition comprising (a) butylated hydroxyanisole and (b) an antioxidant-containing material selected from the group consisting of whole sage, mace, rosemary, Comptonia peregrina, and Tilia hrezentia, or alcohol extracts thereof, or residue recovered from said extracts, said antioxidant-containing material being present in said antioxidant composition in an amount which is effective as a synergist for the anti-oxidant action of said butylated hydroxyanisole.

2. The process of claim 1, wherein said butylated hydroxyanisole is added to said food in a concentration of from about 0.0001 percent to about 0.02 percent by weight of the oil or fat in said food and said antioxidant-containing material is added to said food in a concentration of from about 0.1 percent to about 25.0 percent by weight of the oil or fat in said food.

3. Process according to claim 1, wherein said antioxidant-containing material is an ethanol extract.

4. Process according to claim 1, wherein said antioxidant-containing material is the residue from said alcohol extract of said antioxidant-containing material.

* * * * *